United States Patent [19]

Markow et al.

[11] Patent Number: 4,958,777

[45] Date of Patent: Sep. 25, 1990

[54] WINDING MACHINE FOR WOVEN CROSSED-COIL AIR CORE GAUGE

[75] Inventors: Paul A. Markow, Huntsville; William Nolle, Hazel Green, both of Ala.

[73] Assignee: Acustar, Inc., Troy, Mich.

[21] Appl. No.: 435,214

[22] Filed: Nov. 13, 1989

[51] Int. Cl.⁵ ............................................. H02K 15/00
[52] U.S. Cl. ..................................... 242/7.11; 29/596; 29/605
[58] Field of Search ................. 242/7.11, 7.14, 7.05 B, 242/7.05 C, 7.09, 3; 29/596, 605

[56] References Cited

U.S. PATENT DOCUMENTS

| | | | |
|---|---|---|---|
| 3,701,489 | 10/1972 | Goldsworthy et al. | 242/7.02 X |
| 4,553,093 | 11/1985 | Chikasue | 324/169 |
| 4,633,174 | 12/1986 | Lindig et al. | 324/143 |
| 4,827,210 | 5/1989 | Lindig et al. | 324/146 |

Primary Examiner—Daniel P. Stodola
Assistant Examiner—William G. Battista, Jr.
Attorney, Agent, or Firm—Wendell K. Fredericks

[57] ABSTRACT

A cross-coil winding system for forming woven stator coils for air-core gauges that have orthogonal coils with equal radii.

6 Claims, 3 Drawing Sheets

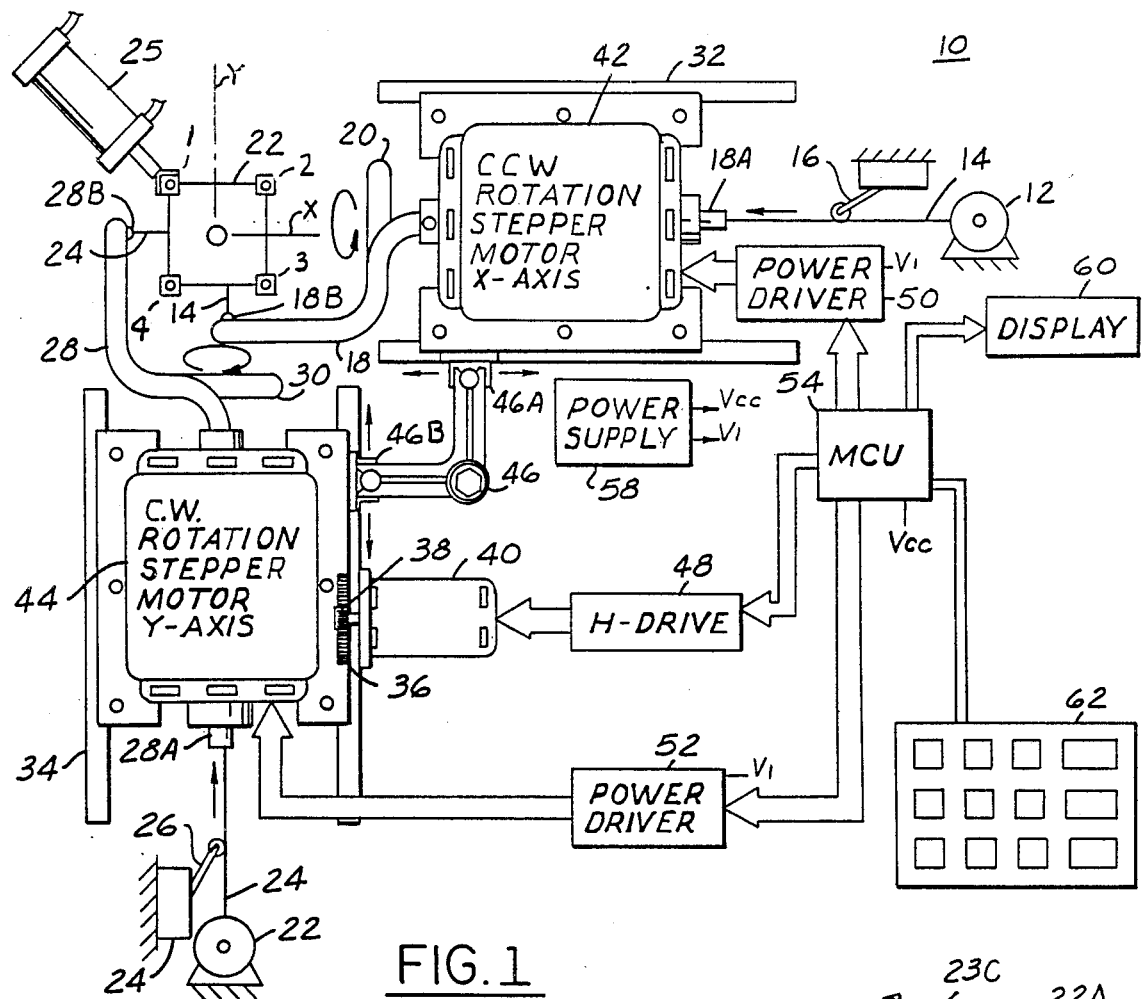
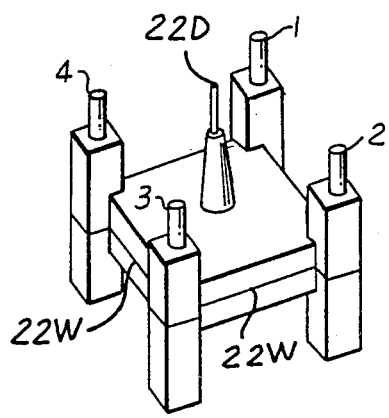
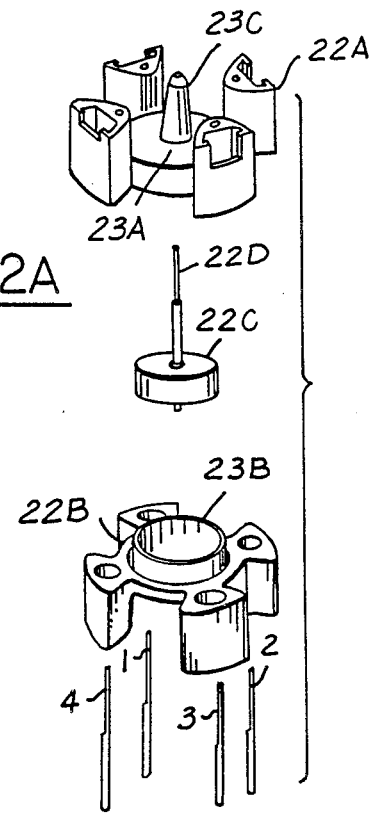
FIG.1
FIG.2B
FIG.2A

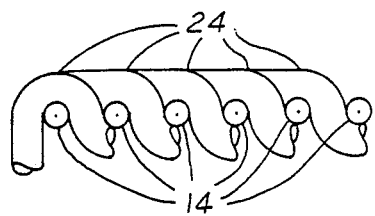
FIG. 5
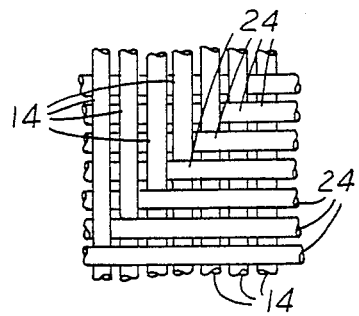
FIG. 7
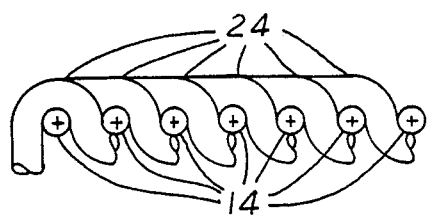
FIG. 6
FIG. 8
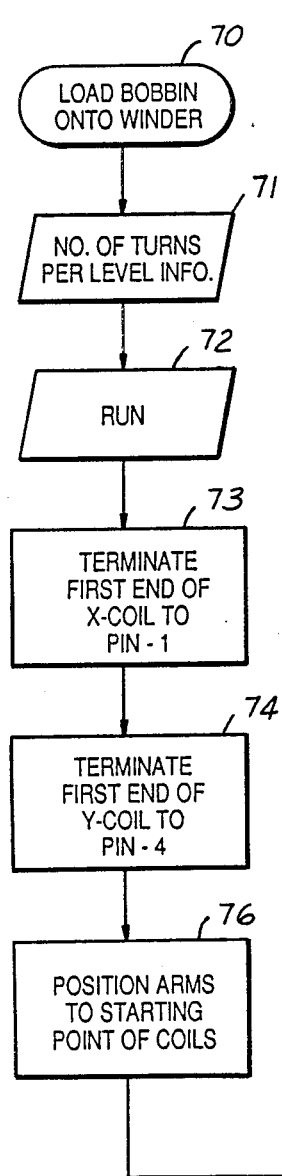
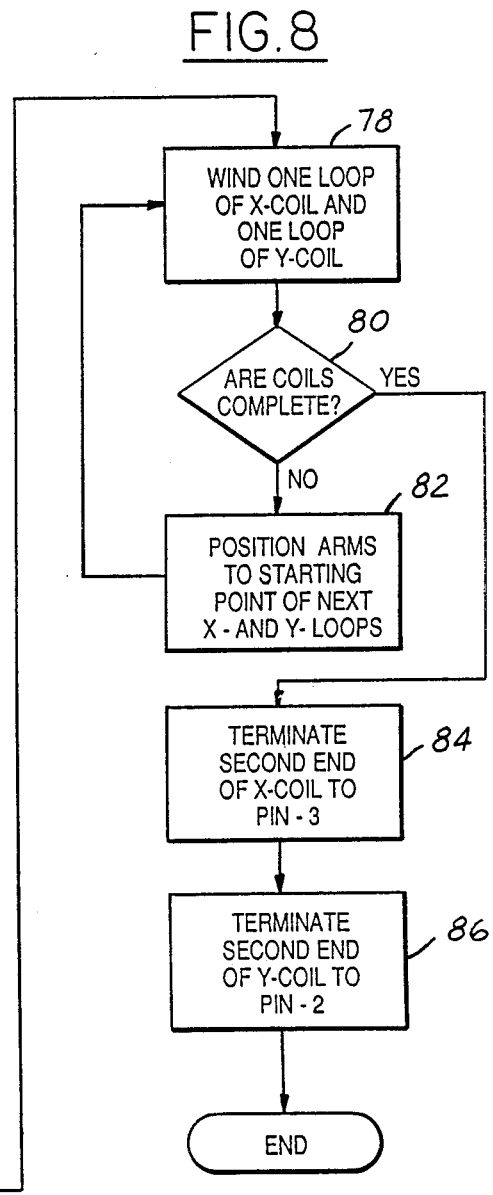

WINDING MACHINE FOR WOVEN CROSSED-COIL AIR CORE GAUGE

BACKGROUND OF THE INVENTION

1. Field of the Invention

The present invention relates to woven air-core gauges and, more particularly, to an apparatus for weaving orthogonally positioned stator coils for air-core gauges.

2. Description of the Prior Art

In a conventional air-core gauge with normal orthogonally positioned electro-magnetic stator coils wound about a non-metallic material bobbin, a problem exists in producing electro-magnetic fields of equal intensity in the orthogonally positioned stator coils. Within a central region of a bobbin, a magnetized rotor rotatably mounts in magnetic proximity to the stator coils and attaches to an indicator needle which moves angularly over a series of linear graduations on a dial face to indicate changing conditions.

With one coil closer to the rotor than the other, the radii are different. If both coils had an equal number of windings, the coil closest to the rotor would produce a higher field intensity than the other if energized by equivalent current signals.

Realizing the above conditions, efforts were made towards devising an air-core gauge which provides orthogonally positioned stator coils comprised of uniform coils perimeters. Departing from the normal approach of winding individual coils, the present invention features weaving windings of cross coils to produce woven orthogonally positioned coils such that equal radii of the coils result and the rotor mounts in equal magnetic proximity to the orthogonally positioned coils.

BRIEF SUMMARY OF THE INVENTION

The present invention concerns a novel apparatus for weaving stator coil windings about a bobbin to provide orthogonally positioned stator coils comprised of uniform coil perimeters. The apparatus, controlled by a dedicated microcontroller, automatically weaves X directed and Y directed windings about a bobbin to provide stator coils with equal radii.

BRIEF DESCRIPTION OF THE DRAWING FIGURES

FIG. 1 is a partial block, and partial schematic diagram of the winder apparatus of this invention;

FIG. 2A illustrates in perspective view spaced apart components of the bobbin and rotor assembly;

FIG. 2B illustrates the assembled bobbin an rotor assembly;

FIG. 5 is a cross-sectional view of the woven windings taken along the lines 5—5 of FIG. 3C illustrative of the woven pattern of windings about the X axis;

FIG. 6 is a cross sectional view of the woven windings taken along the lines 6—6 of FIG. 3C illustrative of the woven windings about the Y axis;

FIG. 7 illustrates an exploded view of a section of a completed woven structure of the interlaced coils; and FIG. 8 is a flow chart illustrative of the program performed by the microcontroller for operating system 10.

DETAILED DESCRIPTION OF A PREFERRED EMBODIMENT

Figure 3A:
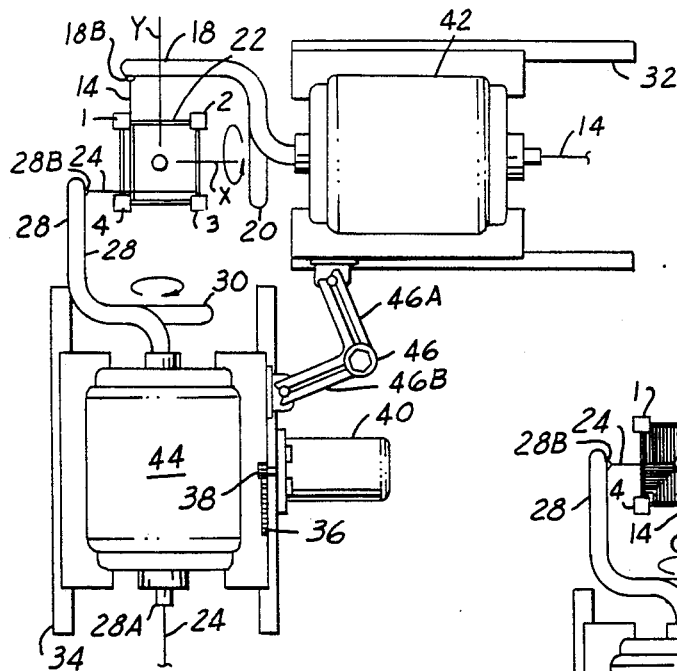
FIG. 3A depicts a starting position of winding the X and Y coils about the bobbin.

Referring now to FIG. 1, a partial block diagram and partial schematic diagram depicts a winder apparatus 10 for interlacing the orthogonal windings of an air-core gauge. A bobbin 22 mounts in a bobbin holding fixture 25 such that the shaft 22D locates at an origin of the X and Y axis. Bobbin 22 supports the interlace windings of the X and Y stator coils.

Spaced apart from bobbin 22, a reel 12 having a central axis in line but perpendicular to the X axis, contains a sufficient amount of wire 14 for winding the stator coil about the X axis. Reel 12 freely rotates about its central axis for dispensing lengths of wire 14.

Wire 14, a single strand conventional stator coil wire; e.g., a 40 gauge wire unwinds from reel 12, routes under a tension arm 16, enters an input port 18A of a tubular winding arm 18, exits from an output port 18B of the tubular winding arm 18 and attaches to bobbin 22 for forming a stator coil, wound about the X axis.

Tubular winding arm 18, a bent shaft, wherein one portion of the bent shaft forms an off-set arm from another portion of the shaft which forms a rotational shaft of a counterclockwise rotation stepper motor 42. The stepper motor shaft portion of arm 18 extends along the X axis. The off-set arm portion of arm 18 extends parallel with the X axis. The stepper motor shaft portion of arm 18 contains an input port 18A for receiving wire 14, and the off-set arm portion of winding arm 18 includes the output port 18B used for routing the wire 14 from arm 18 to bobbin 22. The shaft portion of arm 18 rotates about the X axis under the control of stepper motor 42 in a counterclockwise direction. As the shaft portion rotates in stepper motor 42, the off-set arm portion rotates about an outer perimeter of bobbin 22 about the X axis in a manner for dispensing wire about bobbin 22. At the bend of the arm 18, a counterbalance weight 20 fixedly attaches for counterbalancing the torque action placed upon arm 18 by the rotational action of stepper motor 42.

Stepper motor 42 mounts on a ball-bearing slide track 32 for stepping the shaft portion of arm 18 counter clockwise about the X axis at a rate, for example, of 400 steps per revolution. As arm 18 steps about X axis, stepper motor 42 moves along track 32 in reciprocation in response to motion along the X axis by bell crank 46. A control signal from a power driver module 50 controls the step action of stepper motor 42, and control signals from an H-driver 48 connected to a bell-crank stepper motor 40 control the reciprocation of motor 42 along track 32.

Complementing the stepper motor 42, a clockwise rotation stepper motor 44 containing a tubular winding arm 28, performs the same function as stepper motor 42 but directs winding wire 24 from reel 27 under tension arm 26, through arm 28 and about the Y axis. Stepper motor 44 and winding arm 28 are identical with arm 18 and motor 42 except for the fact that stepper motor 44 rotates arm 28 clockwise about the Y axis. Arm 28 has input and output ports 28A and 28B respectively. Arm 28 also has a counter balance weight 30. Motor 44 moves in reciprocation along track 34 in response to a gear rack 36 mounted to motor 44 and works in conjunction with a pinion 38, which connects to a shaft of stepper motor 40.

Bell crank 46, a lever with two arms 46A and 46B placed at an angle diverging from a given pivot point of crank 46, causes motors 42 and 44 to move simultaneously in opposite directions with respect to bobbin 22 in synchronization to the step action of stepper motor 40. When arm 18 is above bobbin 22, arm 28 is below bobbin 22. Stepper motor 44 receives control signals for step action from power driver 52.

A microcontroller 54, connected to a power supply 58 for receiving power and connected to a keypad 62 in a display unit 60, responds to previously stored instructions to send control signals to power drivers 50 and 52 for controlling the step action of stepper motors 42 and 44 respectively. MCU 54 contains a factory installed program which controls providing control signals to power drivers 50 and 52 which regulates the movement of X and Y stepper motors 42 and 44 respectively in stepping the respective winding arms about the X and Y axes. Control signals from MCU 54 also route to H-driver 48, which provides direction and control signals that reflect the instructions of MCU 54.

Keypad 62 permits an operator to input parameters into MCU 54 so that the number of turns per level of wire to be wound on bobbin 22 can be computed. Keypad 62 also permits initiating the operation and for programing the duration of the winding procedure.

Display unit 60 provides a visual status of progress of the winding procedure.

MCU 54, illustratively, is a single chip 8-bit unit such as a NECµPD7810 microcomputer chip containing a ALU, on-chip clock, ROM, RAM, I/O ports and an eight channel 8-bit A/D converter.

Referring now to FIG. 2A, a disassembled bobbin and loader assembly is depicted. This assembly includes an upper bobbin 22A and a lower bobbin 22B. A rotor 22C has a rotor shaft 22D extending perpendicularly through a center axis. The upper and lower bobbins have a cavity 23A and 23B respectively which, when the upper bobbin 22A mates with the lower bobbin 22B, forms a rotor chamber 23 which houses rotor 22C.

When assembled, rotor 22C mounts in chamber 23 and the upper bobbin 22A mates with the complementary lower bobbin 22B and the two bobbins are joined by metal terminals 1-4 The shaft 22D routes through a journal 23C formed at a center region of cavity 23A.

In FIG. 2B, the assembled bobbin and rotor assembly is depicted. Note that the mated upper and lower bobbin forms the side walls 22W—22W and the terminals 1-4 form posts for initiating and terminating the X and Y windings.

Referring now to FIG. 3A, a bobbin 22 is positioned to receive the initial winding about the X and Y axes. The X axis winding is started at post 1 while the Y axis winding is started at terminal 4. To terminate wire 14 on terminal 1, the microcomputer MCU 54 is instructed to cause motor 42 to move forward and backward in conjunction with rotating winder arm 18 such that the end of wire 14 wraps tightly around terminal 1. A similar operation is conducted to wrap the end of wire 24 around terminal 4.

Figure 3B:
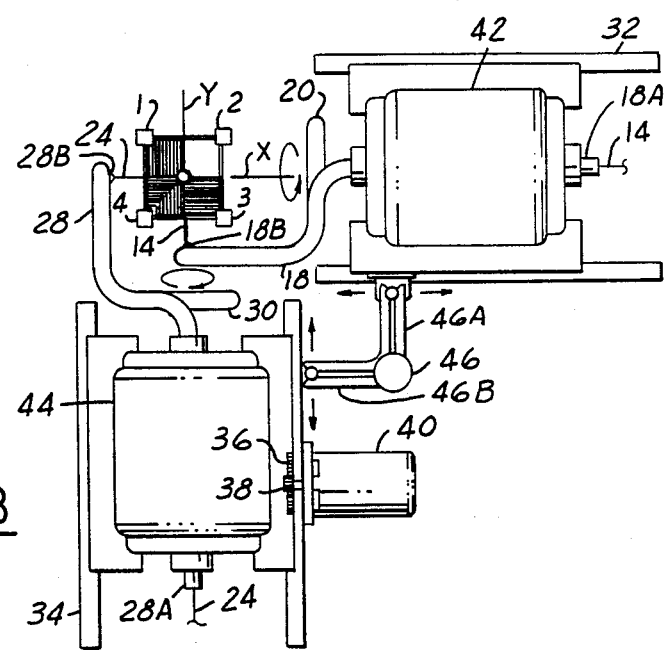
FIG. 3B depicts a partially wound bobbin.

Upon completing terminating the first end of wire 14 and wire 24, motors 42 and 44 steps arm 18 and arm 28 counterclockwise and clockwise, respectively, about the periphery of bobbin 22 while stepper motor 40 and the rack and pinion 36 and 38 respectively cause bell crank 46 to angularly move in a direction such that the arm 18 moves away from the bobbin along the X axis while arm 28 moves towards the bobbin along the Y axis. This simultaneous movement and arm winding of wire 14 and 24 about the periphery of bobbin 22 causes interlacing of wire 14 with wire 24 which produces a weaved wire structure about shaft 22D in a top plane of bobbin 22 and a bottom plane as well. This interlacing is shown in FIG. 3B where substantially one-half of the bobbin periphery has been wound. Moving in reciprocation when stepper motor 40 causes the X axis stepper motor 42 to move forward along the X axis towards bobbin 22, the clockwise rotation stepper motor 44 is moved backwards or retracted from bobbin 22. This reciprocation action continues until several layers are installed about bobbin 22.

Figure 3C:
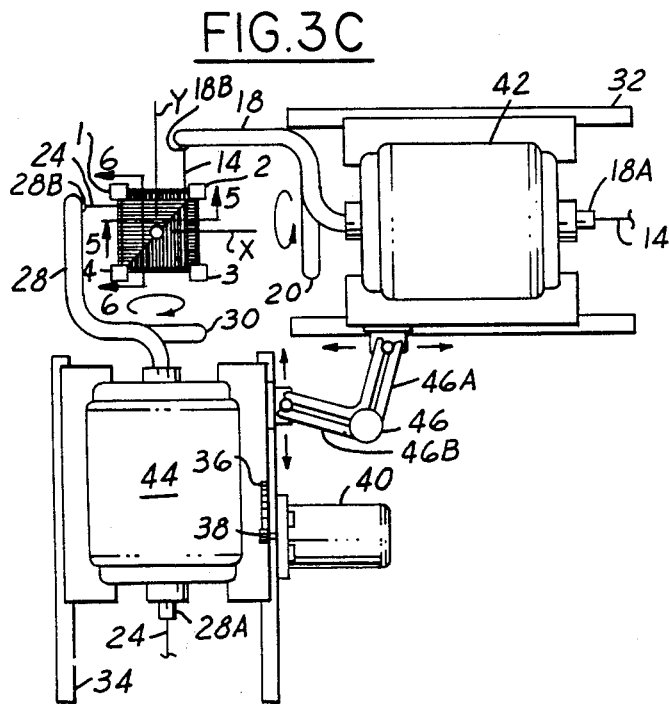
FIG. 3C depicts the final windings about the bobbin.

With reference now to FIG. 3C, upon completion of interlacing wire 14 with wire 24 to form this weave pattern about the shaft axis of bobbin 22, the ends of the windings are terminated.

Figure 4:
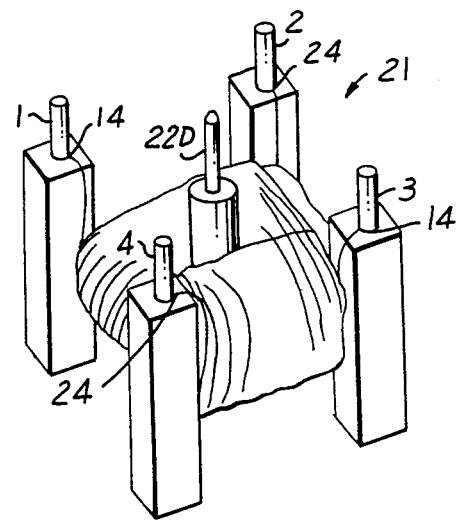
FIG. 4 depicts in perspective view a completed woven air-core gauge.

FIG. 3C depicts the final step of terminating the ends of wire 14 at terminal 3 and terminating wire 24 at terminal 2. The ends of the wires are pulled taunt and cut and the winding operation is ceased. FIG. 4 depicts a completed gauge 21 with the wires terminated at four terminals and the shaft 22D available to receive the dial face and pointer to complete the gauge structure. A metallic cover (not shown) slides over the entire gauge to enclose it and to shield the windings from external electro-magnetic interference and to provide a path for returning the flux lines to the coil region.

Referring now to FIGS. 5, 6 and 7, FIG. 5 depicts the interlacing of windings of wire 14 and the windings of wire 24 along 5—5 of FIG. 3C. FIG. 6 depicts the interlacing of wires 14 and 24 along the section of 6—6 of FIG. 3C. FIG. 7 illustrates an exploded view of a section of a completed woven structure of the interlaced coils.

OPERATION OF THE SYSTEM

The flowchart in FIG. 8 depicts the operation of the winder system 10. Bobbin 22 is loaded onto the winder and held in place by bobbin holding fixture 25 (step 70).

An operator determines the length of the bobbin and the diameter of the wire to be wrapped about the periphery of bobbin 22 and, using keypad 62, feeds this information to MCU 54. MCU 54 computes the number of turns per level and the number of levels of interlacing that has to be performed (input operation block 71).

The operator then instructs MCU 54 to begin the operation by pressing the run button on keypad 62 (input operation block 72).

The initial operations conducted on bobbin 22 by system 10 requires that the end of the X coil winding or wire 14 be terminated at terminal 1 (step 73) and for the first end of the Y coil wire 24 to be terminated at terminal 4 (step 74). MCU 54 sends instructions to the power drivers 50 and 52 which causes the two stepper motors 42 and 44 to operate and cause movements of the X axis stepper motor and the Y axis stepper motor to step their respective arms about pin terminals 1 and 4 in such a manner as to terminate ends of wires 14 and 24 at their respective pins.

Upon completion of the termination of the ends of the X coil wire and the Y coil wire, MCU 54 is instructed to position the arms 18 and 28 at the starting points of the bobbin (step 76). The X axis stepper motor 42 is at its maximum forward position towards bobbin 22 and the Y axis stepper motor 44 is at its maximum retracted distance away from bobbin 22.

Then MCU 54 is instructed to cause system 10 to wind one loop of X coil and one loop of Y coil winding about bobbin 22 (step 78). Following this operation, MCU 54 makes a decision as to whether the number of turns required to complete the coils have been wound (decision block 80). If the coils are not completed, then MCU 54 is instructed to cause the system to position the winding arms to the starting point for the next X and Y loops (step 82). At the completion of the next loop, MCU 54 is instructed to loop back to step 78 and wind the next loop. MCU 54 stays in this loop between steps 78, 80 and 82 until all the windings of both coils are wound and interlaced. Upon completion of the coils, as indicated at decision block 80, MCU 54 is instructed to terminate the ends of the X coil to terminal 3 (step 84), and then to terminate the second end of the Y coil to terminal 2 (step 86). Upon completion of terminating the second ends of the windings, MCU 54 instructs the system to turn off and end the procedure.

I claim:

1. Winding system for weaving a pair of orthogonally positioned stator coils about a non-metallic, coil-bobbin, square frame, the frame having four corner posts, four side walls and a central region containing a non-metallic rotor chamber housing a permanent magnet rotor, the rotor having a shaft extending from a centroid of the rotor and through a port of the chamber in the direction of the posts, said system comprising:

(a) holding means for fixedly holding the frame by a first post and for positioning the shaft perpendicular to an origin of an X-Y coordinate-axis plane, with the first, second, third and forth posts (counting in a clockwise manner about the origin) positioned at a location in a quadrant bound by a positive Y and a negative X axis, a positive Y and a positive X axis, a negative Y and a positive X axis, and a negative Y and a negative X axis respectively;

(b) first winding means for winding a first length of wire about a perimeter of the frame in a spiral-type, counterclockwise motion from said first post in a positive X axis direction to within the location of said second and third posts and then in a negative X axis direction towards said first and fourth posts;

(c) second winding means for winding a second length of wire about a perimeter of the frame in a spiral-type, clockwise motion from said fourth post in a positive Y axis direction to within the location of said first and third posts and then in a negative Y axis direction towards said third and fourth posts;

(d) reciprocation means coupled to said first and second winding means for synchronizing movement of said winding means such that said first winding means causes a portion of a coil winding to locate at a bottom region of the frame in line with the origin while said second winding means causes a portion of another coil winding to locate at a top region of the frame about the shaft; and (e) computing means connected to said first and second winding means and said reciprocating means for providing logic control signals for controlling the operation of said first and second winding means and said reciprocating means.

2. Apparatus in accordance with claim 1 wherein said first winding means includes:

(a) first wire dispensing reel means spaced apart from the bobbin having a central axis in line but perpendicular to the X- axis containing the first length of wire for dispensing the first length of wire in a manner for interlacement with the second length of wire; and (b) counterclockwise rotation stepper motor means positioned between said first dispensing means and said bobbin such that a central axis of said counterclockwise motor means is in line with the origin of the bobbin and the central axis of the first dispensing means, said counterclockwise motor means containing a tubular shaft bent to form a first portion that operates as a rotational shaft of the counterclockwise motor means that extends along the X axis and contains an input port for receiving the first length of wire and another portion that operates as an off-set arm that extends parallel to the X axis and rotates counterclockwise about an outer perimeter of the bobbin and contains an output port for routing the first length of wire to the bobbin; and (c) first power driver means for providing current signals to said counterclockwise motor means in response to logic control signals from said computing means.

3. Apparatus in accordance with claim 2 wherein said second winding means includes:

(a) second wire dispensing reel means spaced apart from the bobbin having a central axis in line but perpendicular to the Y axis containing the second length of wire for dispensing the second length of wire in a manner for interlacement with the first length of wire;

(b) clockwise rotation stepper motor means positioned between said second dispensing means and said bobbin such that a central axis of said clockwise motor means is in line with the origin of the bobbin and the central axis of the second dispensing means, said clockwise motor means containing a tubular shaft bent to form a first portion that operates as a rotational shaft of the clockwise motor means that extends along the Y axis and contains an input port for receiving the second length of wire and another portion that operates as an off-set arm that extends parallel to the Y axis and rotates clockwise about an outer perimeter of the bobbin and contains an output port for routing the second length of wire to the bobbin; and (c) second power driver means for providing current signals to said clockwise motor means in response to logic control signals from said computing means.

4. Apparatus in accordance with claim 3 wherein said reciprocating means includes:

(a) a first and second slidable track means attached to said counterclockwise and clockwise motor means respectively for transporting said motor means along the associated coordinate axis;

(b) a bell crank means coupled to said first and second track means for effecting alternate movement forward to and backward from the origin;

(c) reciprocation motion stepper motor means including a track and pinion coupled to one of said slidable track means for causing said first track means to move forward along the X axis while said second track means moves backward along the Y axis and vise versa ; and (d) H-driver means for providing current signals to said reciprocating stepper motor means in response to logic control signals from said computing means.

5. Apparatus in accordance with claim 4 wherein said computing means includes:

(a) keypad means for permitting an operator to input data and control signals;

(b) display means;

(c) means for determining a number of turns of wire for use by said clockwise and counterclockwise winding motor means and a number of levels of interlacing of the first and second lengths of wire;

(d) step computing means for determining the number of steps said counterclockwise, clockwise and reciprocating stepper motors must step to interlace each level of the first and second lengths of wire;

(e) power supply means coupled to said first and second power drive means and said H-driver means for supplying input power;

(f) means for computing the amount and direction of current that said first and second power drive means and said H-driver means need for driving the respective stepper motors; and (g) logic signal control means for providing logic signals to said first and second power drive means and said H-driver means to control the winding and interlacing of the first and second lengths of wire.

6. Apparatus in accordance with claim 5 wherein said computing means is a microcontroller means, wherein said number of turns of wire determining means, said step computing means, said current and current direction computing means and said logic control signal means are microcontroller instructions in firmware of said microcontroller means.

* * * * *